MICHAEL H. HARGER, INVENTOR.

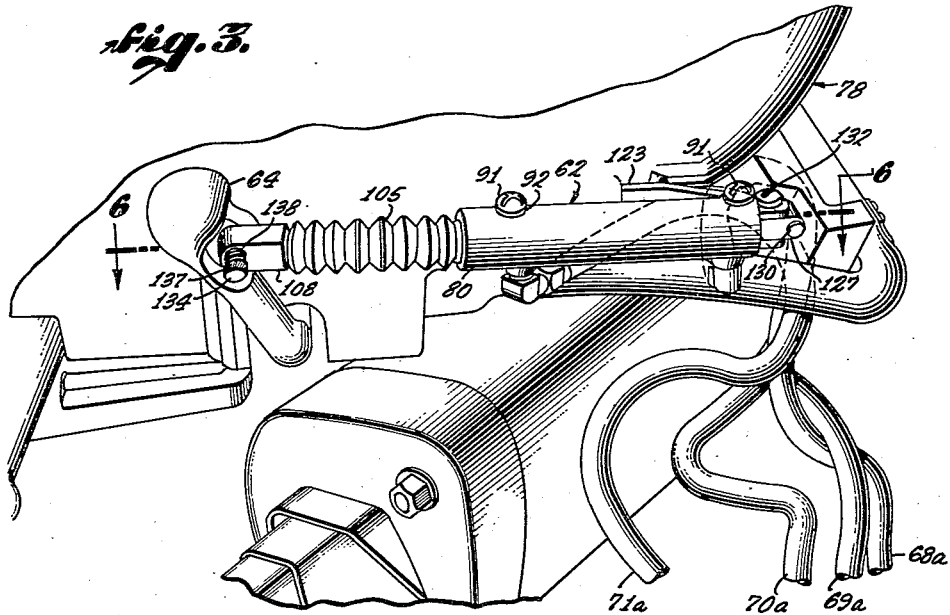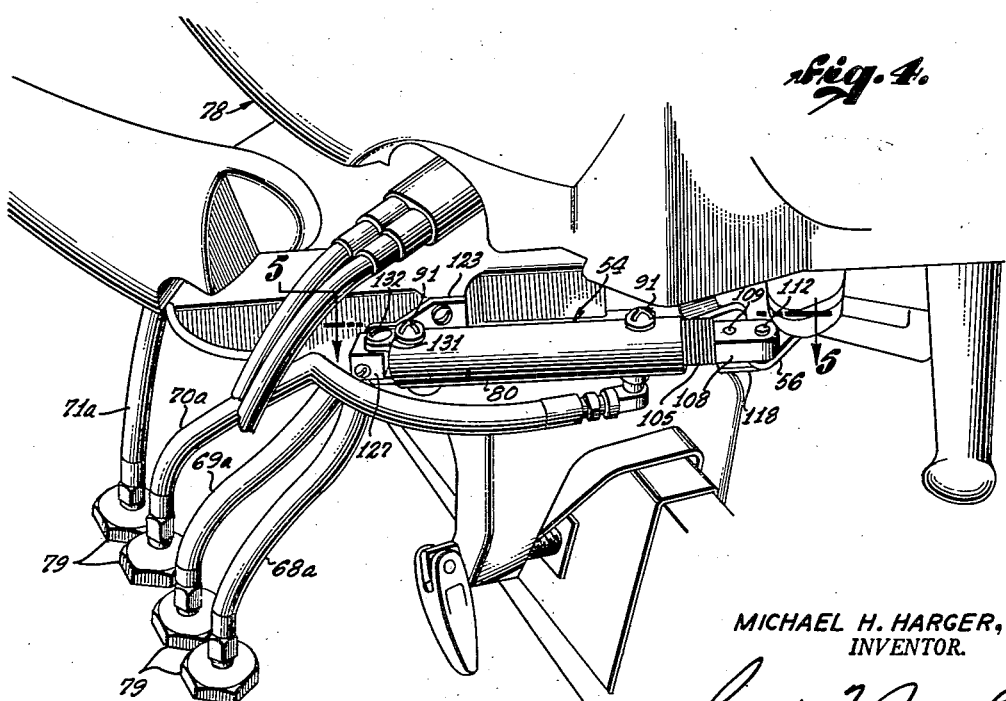

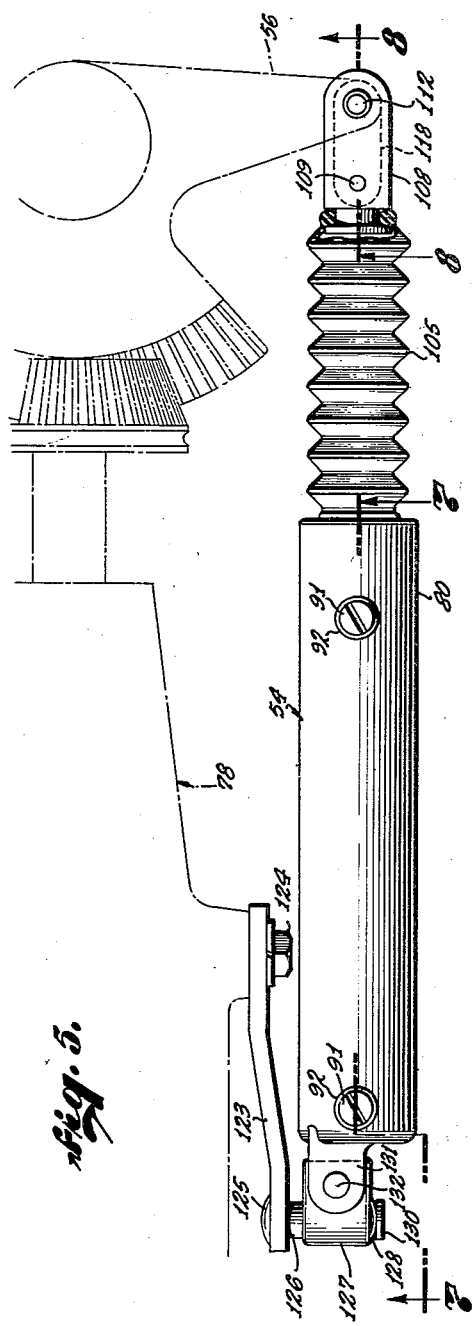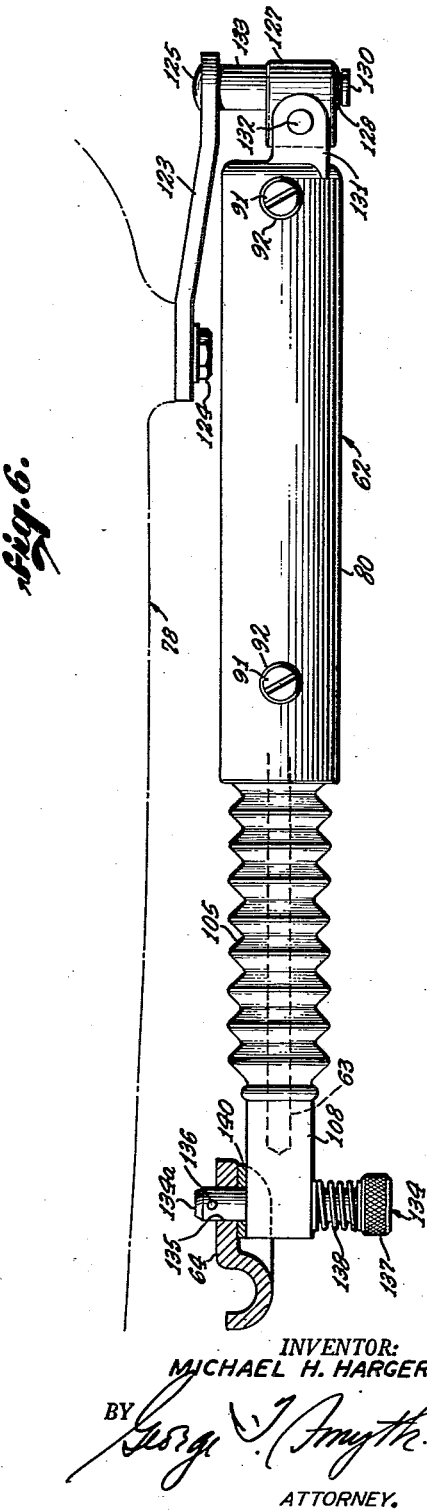

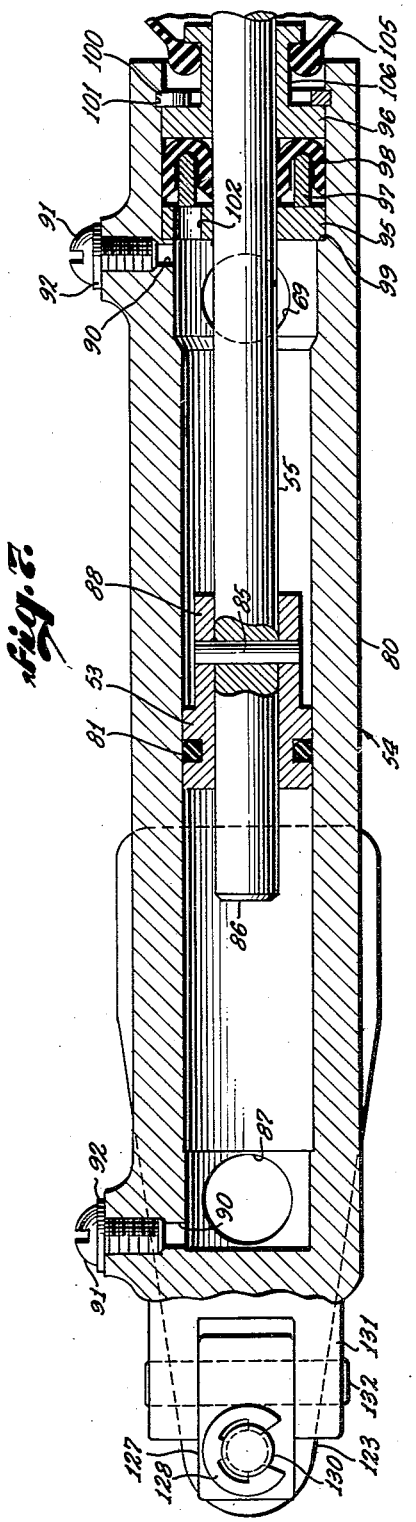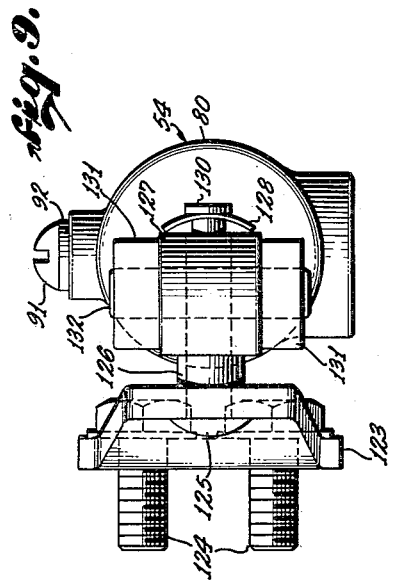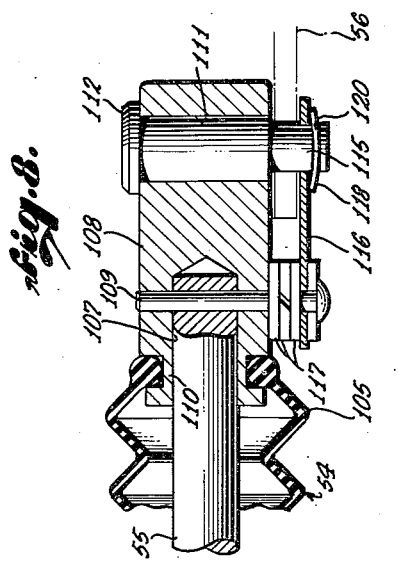

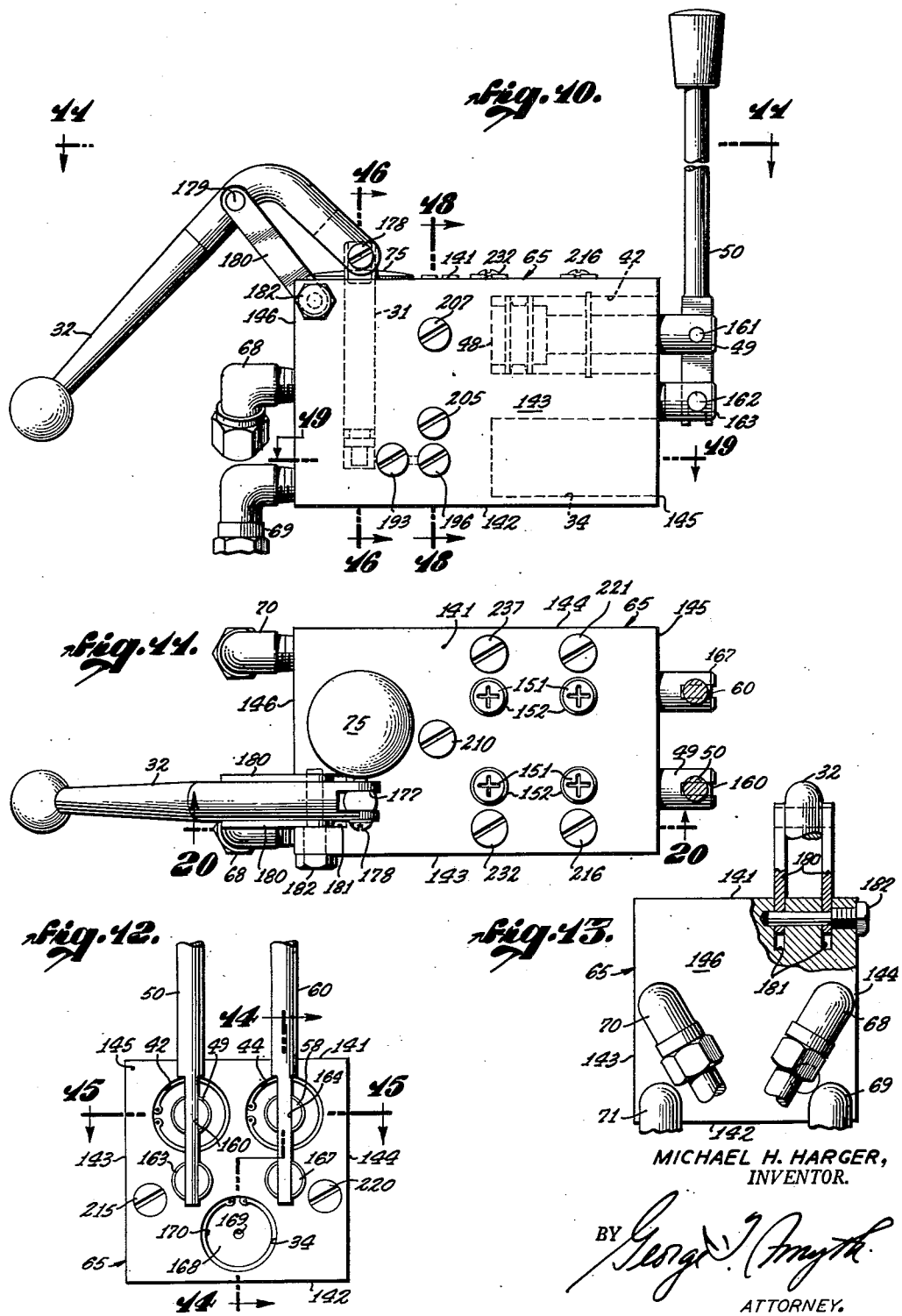

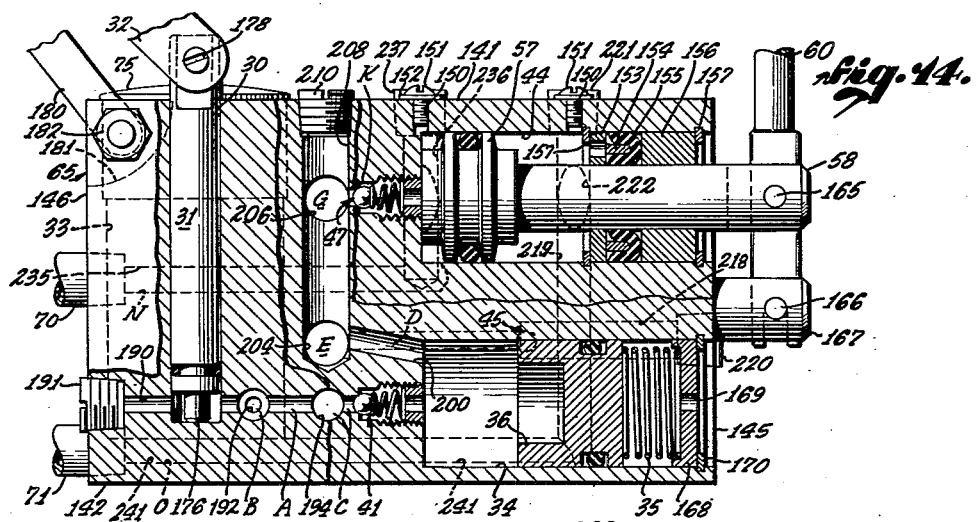
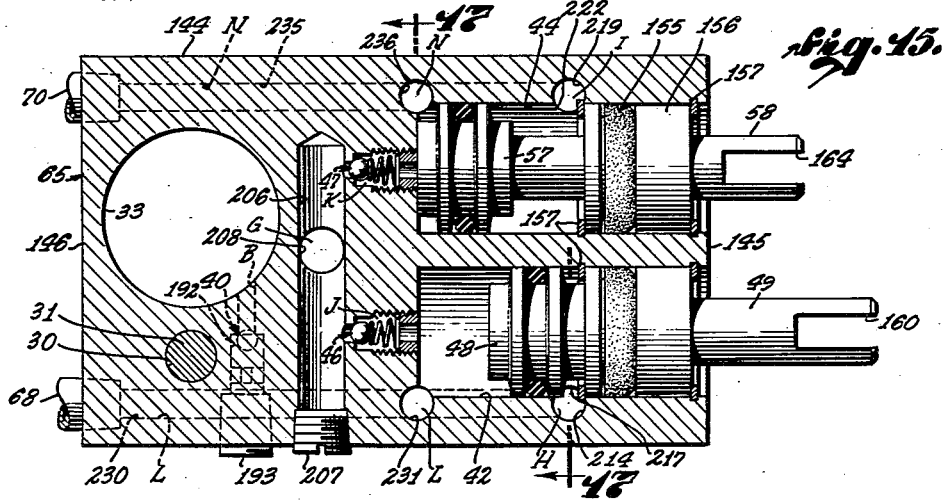
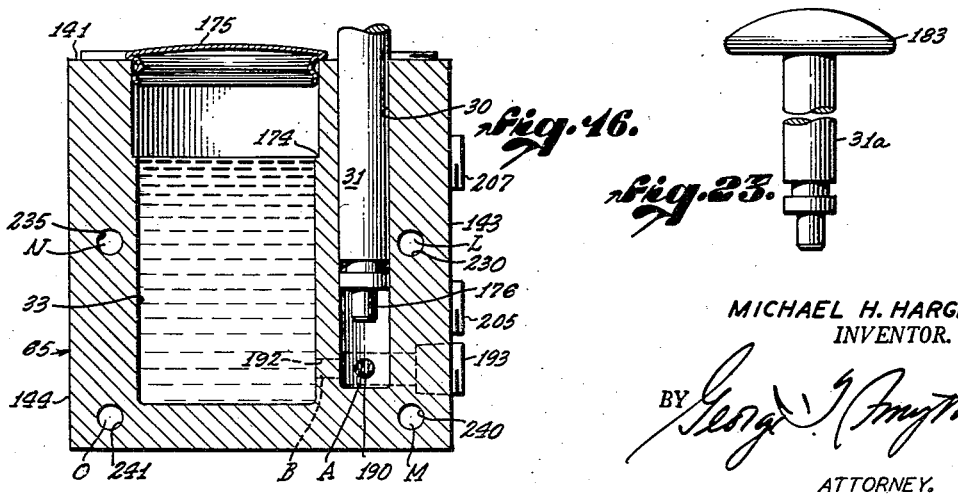

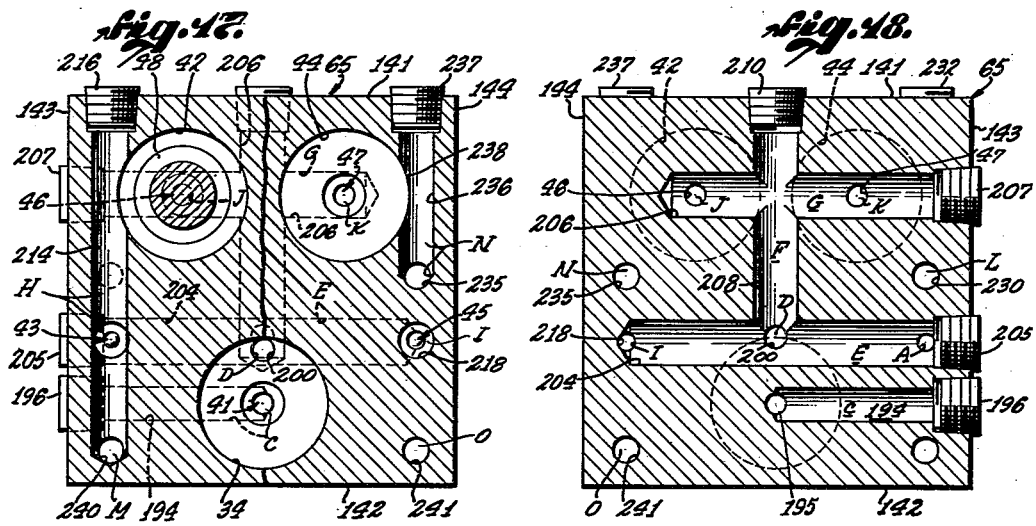
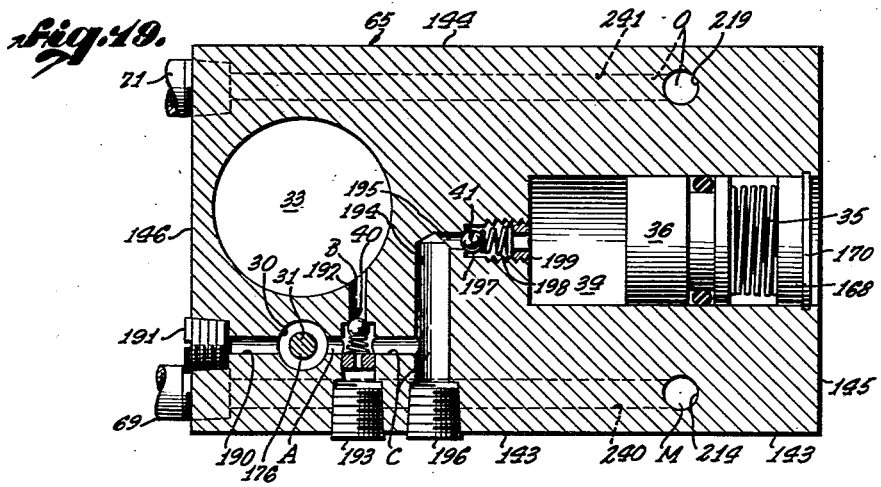
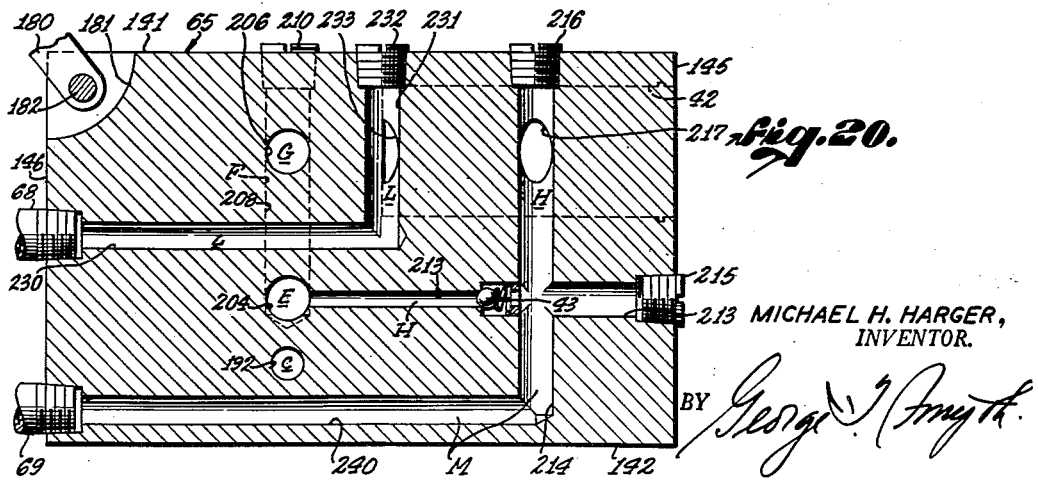

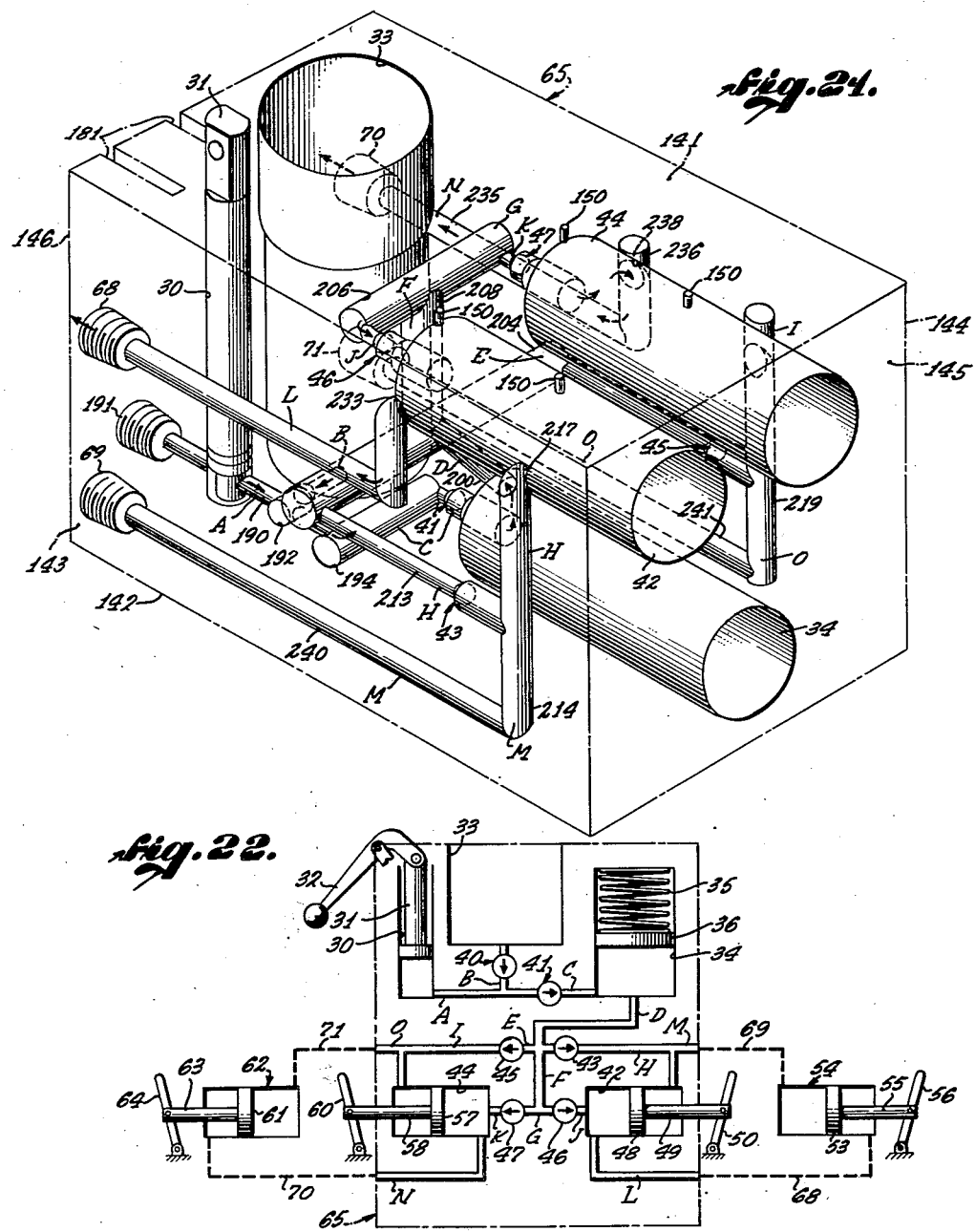

United States Patent Office 2,796,737
Patented June 25, 1957

2,796,737

HYDRAULIC REMOTE CONTROL SYSTEM

Michael H. Harger, Los Angeles, Calif., assignor of seventy-five percent to Sanford H. Grosberg, Los Angeles, Calif.

Application December 8, 1953, Serial No. 396,843

3 Claims. (Cl. 60—54.5)

This invention relates to hydraulic remote control systems in which a master unit at a control station governs a remote slave unit, and more particularly relates to such a system of relatively simple construction that is actuated solely by manual force.

The invention has special utility in its initial embodiment as a system for remote control of the throttle and of the gear shift of an outboard motor on a small boat. This particular embodiment of the invention will be described in detail for the purpose of the present disclosure and to provide adequate guidance for those skilled in the art who may have occasion to apply the same principles to other specific remote control purposes.

An outboard motor on a small boat is pivotally mounted on the rear of the boat to swing about an upright axis to serve as a manually operable rudder as well as a power plant. When a relatively small outboard motor is used on a relatively small boat such as a boat of the size of a rowboat, the operator naturally sits at the stern adjacent the outboard motor and no problem of remote control is involved. When a larger boat is equipped with more powerful outboard motor, however, it is desirable to provide a steering system with a helm or steering wheel several feet forward from the stern for swinging the outboard motor about its axis by remote control. Since such an arrangement places the operator several feet from the engine, it is also desirable to provide an additional system for remote control of the engine.

Since an outboard motor in the larger sizes has a gearshift in addition to the usual throttle, one requirement for such a remote control system is that it afford separate and independent adjustment of these two engine controls. Another requirement is that the remote control system avoid interfering with the freedom of the outboard motor to swing about its upright axis. A further requirement is that the control system be relatively simple and inexpensive, the power involved being merely manual force.

The present invention meets these requirements by employing a simple hydraulic system consisting essentially of two remote slave units on the outboard motor for power output to actuate the throttle and gearshift respectively, two corresponding master units for manual power input at the forward control station, and suitable conduits for transmitting power from the master units to the slave units, at least portions of the conduits being flexible to avoid interference with the rudder movements of the motor assembly. The preferred practice of the invention also includes an accumulator to hold the hydraulic fluid under pressure, a reservoir to supply replenishing fluid and a hand pump to transfer fluid from the reservoir to the accumulator.

To maintain effective pressure in such a system, it is necessary merely to operate the hand pump occasionally for a few strokes. A feature of the invention in this regard is that the accumulator is in free communication with all of the fluid spaces in both the master units and the slave units and each of these fluid spaces has an individual bleeder valve. Such an arrangement makes it possible to fill all the spaces completely with hydraulic fluid and also provides for eliminating any tendency for pockets of air to accumulate in the system. To maintain the control system in a tight lag-free state of operation, it is merely necessary to open the bleeder valves occasionally for slight release flow sufficient to permit all of the trapped air to escape.

Such a remote control system has many component parts since, in addition to the two slave units, it includes two master units, a reservoir, an accumulator, and a pump. Moreover, the system must include numerous conduits to interconnect all of these components and, of course, check valves must be provided to prevent reverse flow in the system. The problem with respect to small boats is to simplify the construction of such a remote control system so that it may be an economical investment for the small boat owner and may be installed in a simple manner requiring no specialized skill.

The invention solves this problem of achieving simplification and low cost by using solid block material for the master control unit with cavities in the solid material to provide all of the components of the master control unit and with bores in the solid material to serve as the conduits required for interconnecting the components. In this regard, a feature of the invention is the concept of providing an intricate system of conduits for the master control unit with numerous changes in conduit direction simply by making straight bores extending into the block of solid material from the various surfaces of the block. The bores intersect each other for changes in direction and the outer ends of the bores are plugged as may be required to confine the hydraulic fluid in the resulting conduit passages. While a block of solid metal or of suitable plastic material may be bored, drilled and otherwise machined to carry out this concept, a feature of the invention is an arrangement of cavities and bores that makes it possible to die-cast the block of material with all of the necessary cavities and bores formed by the casting operation.

One important advantage of using a block of solid material for this purpose is that it results in an exceptionally compact organization of the components of the system. Another important advantage is that it reduces to a minimum the surfaces of the component parts and conduits of the system that are exposed to the corrosive effects of salt spray. A further advantage is that it is a simple matter to install such a unit in a small boat. A still further advantage is that it is a simple matter to make such a unit of pleasing design to give the owner greater pride in his boat.

The invention with its various features and advantages will be understood from the following detailed description considered with the accompanying drawings.

In the drawings, which are to be regarded as merely illustrative:

Figure 3 is a perspective view on a larger scale showing the other slave unit mounted on the motor for controlling the gearshift lever;

Figure 4 is another perspective view of the slave unit for control of the motor throttle.

Figure 5 is a plan view of the slave unit controlling the motor throttle;

Figure 6 is a similar plan view of the slave unit controlling the motor gear shift;

Figure 7 is a section of the throttle-controlling slave unit taken as indicated by the line 7—7 of Figure 5;

Figure 8 is a similar section taken as indicated by the line 8—8 of Figure 5;

Figure 9 is a rear end view of a slave unit showing a special bracket attached thereto that may be used for mounting the slave unit on an outboard motor;

Figure 10 is a side elevation of a selected embodiment of the master control unit with the housing of the unit removed to show the block of solid material that forms the major portion of the structure of the master control unit;

Figure 11 is a view partly in plan and partly in section as indicated by the line 11—11 of Figure 10;

Figure 12 is a front elevation of the unit shown in Figure 10;

Figure 13 is a rear elevation of the unit with a portion broken away to reveal concealed structure;

Figure 14 is a longitudinal section taken as indicated by the broken line 14—14 of Figure 12;

Figure 15 is a horizontal section taken as indicated by the line 15—15 of Figure 12;

Figure 16 is a transverse vertical section taken as indicated by the line 16—16 of Figure 10;

Figure 17 is a transverse section taken as indicated by the line 17—17 of Figure 15;

Figure 18 is a transverse vertical section taken as indicated by the line 18—18 of Figure 10;

Figure 19 is a horizontal section taken as indicated by the line 19—19 of Figure 10;

Figure 20 is a longitudinal vertical section taken as indicated by the line 20—20 of Figure 11;

Figure 21 is a phantom perspective view of a block of solid material indicating the arrangement of apertures and bores therein;

Figure 22 is a diagram of the control system; and

Figure 23 is a side elevation of a modified form of pump plunger that may be used.

Figure 1:
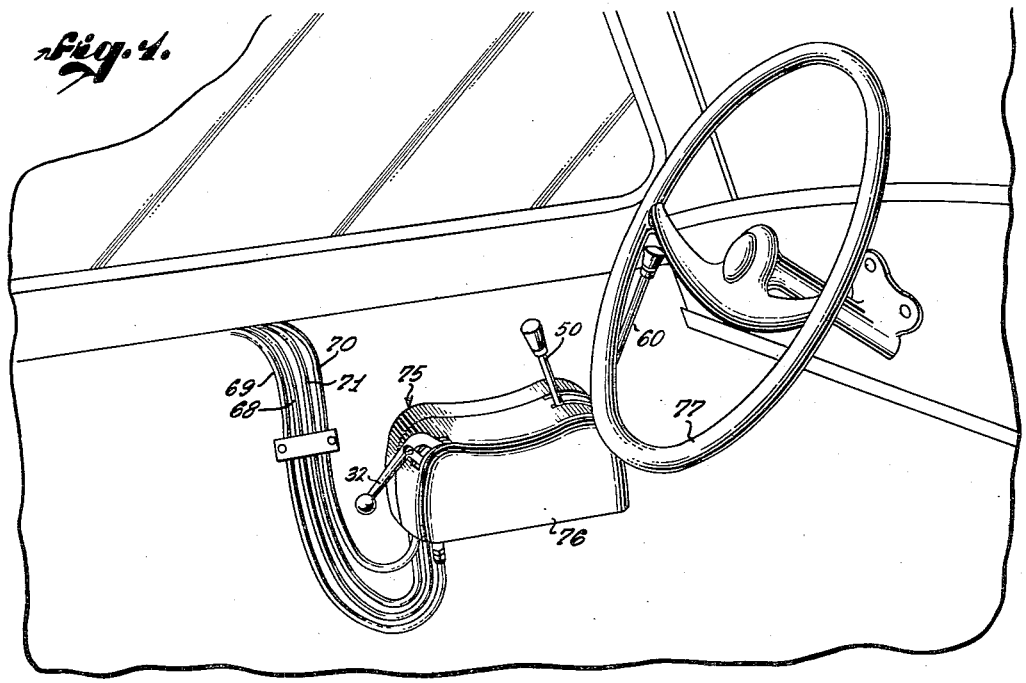
Figure 1 is a perspective view showing the presently preferred embodiment of the master control unit installed in the cabin of a small boat.

The mode of operation of the remote control system may be understood by referring to Figure 22 in which the components of the system are shown diagrammatically. A pump having a cylinder 30 and a plunger 31 operated manually by a handle 32 is connected to a conduit A. The conduit A is connected by a conduit B to a reservoir 33 and is connected by a second conduit C to an accumulator 34. The reservoir 33 holds a reserve supply of the hydraulic fluid and the accumulator 34 is provided with suitable means for maintaining the fluid in the system under suitable pressure. In this instance, the pressure is applied to the fluid by a suitable spring 35 acting on a piston 36 inside the accumulator.

A suitable check valve, generally designated 40, prevents reverse flow in the conduit B and a similar check valve, generally designated 41, prevents reverse flow in the conduit C. It is apparent that on the suction stroke of the pump 31, check valve 41 will close to prevent reverse flow from the accumulator 34 and check valve 40 will open to release fluid from the reservoir 33, and on the power stroke of the pump, check valve 40 will close to prevent reverse flow to the reservoir 33 and check valve 41 will open to permit additional fluid to be forced into the accumulator 34 against the opposition of the spring 35.

A conduit D connects the accumulator 34 with a first manifold E and a conduit F connects the first manifold E with a second manifold G. The manifold E is connected to one end of master cylinder 42 by a conduit H having a check valve 43 and, in like manner, the manifold E is connected to one end of a second master cylinder 44 by a conduit I having a check valve 45. The second manifold G is connected to the second end of the master cylinder 42 by a conduit J having a check valve 46 and is connected to the second end of the master cylinder 44 by a conduit K having a check valve 47.

The master cylinder 42 has a piston 48 which is connected by a piston rod 49 to a power input member or control member 50. The control member 50 is manually operated for remote actuation of the motor throttle. The manual control member 50, in moving the piston 48, moves a piston 53 in a remote slave unit that is generally designated by numeral 54. The piston 53 of the slave unit is operatively connected by a piston rod 55 to the throttle 56 of the outboard motor. In like manner, a piston 57 in the master cylinder 44 is connected by a piston rod 58 to a power input member or manually operable control member 60 for shifting gears. The manual control member 60, in moving the piston 57, actuates the piston 61 in a remote slave unit that is generally designated by numeral 62. The piston 61 in the slave unit 62 is connected by a piston rod 63 with the gearshift lever 64 of the outboard motor.

In the preferred practice of the invention it is contemplated that all of the structure within the area of the dash-dot rectangle 65 in Figure 22 will be included in a single block of solid material to serve as a single master control unit for the system. A conduit L in the master control unit, together with an external conduit 68, connects one end of the master cylinder 42 with one end of the remote slave unit 54 and a conduit M branching from the conduit H in the master control unit is connected to an external conduit 69 to place the other end of the master cylinder 42 in communication with the other end of the remote slave unit. In like manner, a conduit N in the master control unit, together with an external conduit 70, connects one end of the second master cylinder 44 with one end of the remote slave unit 62 and a conduit O branching from the conduit I in the master control unit is connected with an external conduit 71 to place the other end of the master cylinder 44 in communication with the other end of the remote slave unit 62.

The operation of the system may be readily understood from the diagram. Occasional manual operation of the pump handle 32 supplies oil from the reservoir 33 to the accumulator 34 as needed and at the same time, places the spring 35 under stress to maintain the hydraulic fluid in the system under a desired magnitude of pressure. The accumulator 34 supplies hydraulic fluid to the master cylinders 42 and 44 and also to the slave units 54 and 62 through the described system of conduits, reverse flow back to the accumulator being prevented by the check valves 43, 45, 46 and 47.

When the manual control member 50 is shifted to the left as viewed in Figure 22 and causes corresponding leftward movement of the piston 48, the piston displaces fluid in the master cylinder 42 to cause fluid to flow to the slave unit 54 through the conduits L and 68, thereby causing the piston 53 in the slave unit to follow the leftward movement of the master cylinder piston 48. The leftward movement of the piston 53 in the slave unit moves the throttle 56 of the outboard motor in accord with the input movement of the manual control member 50. In like manner, movements of the second manual control member 60 to change gears are transmitted by the second slave unit 62 to the gearshift lever 64 at the outboard motor.

Figure 2:
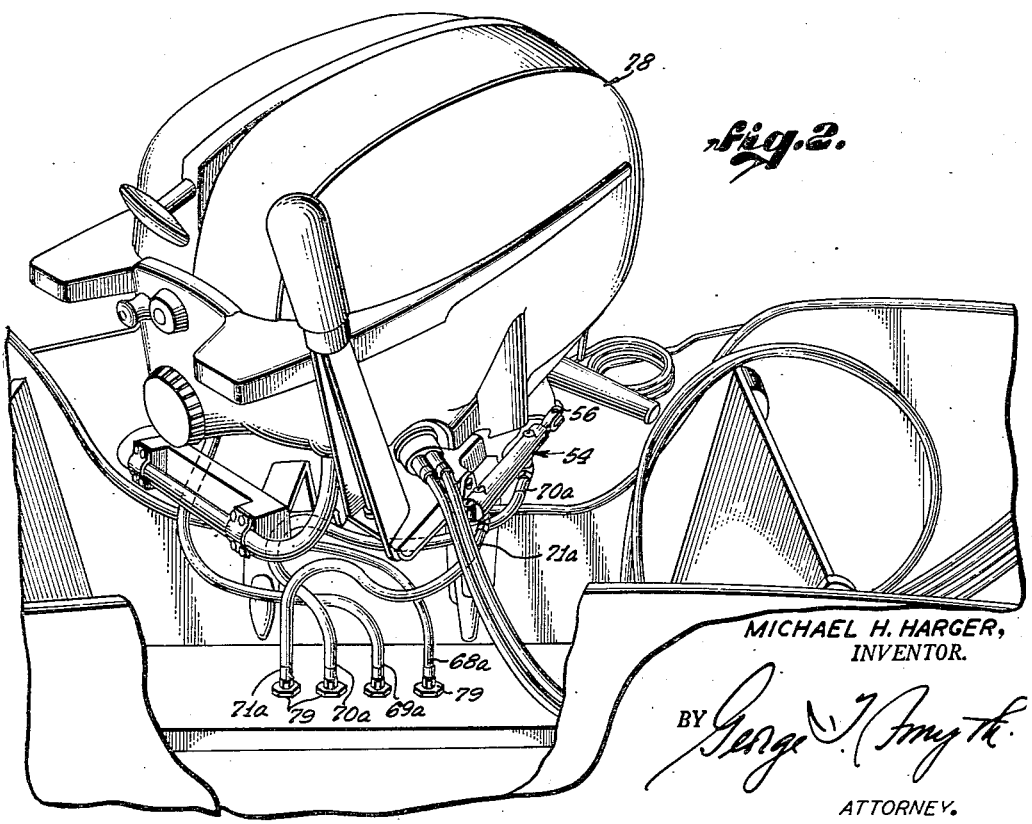
Figure 2 is a perspective view of the outboard motor showing the slave unit mounted thereon for control of the motor throttle.

It will be apparent to those skilled in the art that a remote control system in accord with the diagram in Figure 22 may take various forms in various practices of the invention. In the particular practice of the invention illustrated by the drawings, a master control unit, generally designated 75 (Figure 1) having a suitable housing 76, is mounted at a control station in the cabin of a boat adjacent the steering wheel 77 that controls the rudder movements of an outboard motor, generally designated 78 (Figure 2), on the stern of the boat. As shown in Figure 1, the previously mentioned external conduits 68, 69, 70, and 71 may comprise four pipe lines in the form of four copper tubes, each pipe line including fittings for connection with the master control unit. At the stern of the boat, these four external conduits 68, 69, 70, and 71 are connected by suitable fittings 79 with four corresponding flexible conduits 68a, 69a, 70a, and 71a. The flexible conduits 68a and 69a extend to the slave unit 54 for controlling the motor throttle 56 and the flexible conduits 70a and 71a extend to the slave unit 62 for controlling the gearshift lever 64.

The slave unit 54 for actuating the engine throttle 56 may be constructed and mounted in the manner shown in Figures 5-9. The previously mentioned piston 53 that is connected by the piston rod 55 to the throttle 56, is slidingly mounted in a barrel or cylinder 80 and is provided with a suitable O-ring 81. The piston 53, which is of tubular construction, is mounted on the piston rod 55 by means of a cross pin 85, with an end portion 86 of the piston rod extending rearward from the piston to serve as a stop. Thus, the end portion 86 of the piston rod keeps the piston 53 from blocking a port 87 that is connected with the conduit 69 and, in like manner, a tubular extension 88 of the piston, serves as a stop to keep the piston from moving so far in the other direction as to block a second port 89 that is connected with the previously mentioned conduit 68. The piston 53 divides the interior of the cylinder 80 into two fluid compartments, each of which has a bleeder port 90 that is normally closed by a suitable screw 91 and gasket 92.

The piston rod 55 extends through a suitable packing gland assembly which may comprise an inner packing retainer 95 and an outer packing retainer 96 both of which embrace the piston rod and cooperate to confine a cylindrical spacer ring 97 and a packing ring 98. The inner packing retainer 95 abuts an inner shoulder 99 of the cylinder 80 and the outer packing retainer 96 abuts a split retaining ring 100 that seats in an inner circumferential groove 101 of the cylinder. The packing ring 98 is U-shaped in cross-sectional configuration and fits over the spacer ring 97 as shown. The inner packing retainer 95 may be formed with a suitable aperture 102 to permit fluid pressure to be transmitted readily from inside the cylinder 80 into the space between the two packing retainers, the fluid pressure spreading the U-shaped packing ring 98 into sealing contact with the piston rod and with the surrounding cylinder. Preferably the exposed portion of the piston rod 55 is protected by a suitable bellows or corrugated sleeve 105 of rubberlike material and the outer packing retainer of the packing gland assembly is formed with a suitable neck 106 dimensioned to be engaged in a fluid-tight manner by the end of the sleeve.

As shown in Figure 8, the outer end of the piston rod 55 extends into a socket 107 of a metal block 108 and the metal block is securely attached to the piston rod by a suitable cross pin 109. The metal block 108 is formed with a suitable neck 110 for fluid-tight engagement by the outer end of the corrugated sleeve 105 and has a cross bore 111 to seat a headed pivot pin 112. The pivot pin 112 has a reduced end portion 115 that extends through the outer end of the throttle 56. Preferably, a suitable spring clip 116 is mounted on the underside of the block 108 by means of the previously mentioned cross pin 109 together with washers 117, the spring clip being apertured to receive the reduced end portion 115 of the headed pivot pin 112. A dished retaining ring 118, in engagement with a circumferential groove 120 on the end of the pivot pin 112, abuts the spring clip 116 to hold the pivot pin in place.

The cylinder 80 of the slave unit may be mounted on the outboard motor 78 in any suitable manner that permits the cylinder to follow the arcuate path of the throttle 56. As best shown in Figures 5 and 9, the mounting means may include a bracket 123 that is mounted on the motor by suitable screws 124 and carries a suitable pivot pin 125. The pivot pin 125 carries a short spacer sleeve 126 and a swivel body 127. The swivel body is retained on the pivot pin by a dished retaining ring 128 in engagement with a head flange 130 (Figure 9) on the end of the pivot pin. The swivel body 127 extends between a pair of ears 131 on the rear end of the cylinder 80 and is pivotally connected to the ears by a second pivot pin 132 at right angles to the pivot pin 125. It is apparent that this arrangement supports the end of the cylinder 80 with freedom for universal movement of the cylinder.

The slave unit 62 for actuating the gearshift lever 64 may be of the same construction as the above described slave unit 54 as indicated by the use of corresponding numerals to indicate corresponding parts. In this instance, a relatively long spacer sleeve 133 instead of a shorter sleeve 126 is used with the bracket 123 to mount the slave unit on the side of the motor 78. As shown in Figure 6, the metal block 108 on the outer end of the piston rod 63 of the slave unit 62 is connected to the gearshift lever 64 by a pivot member 134, the pivot member having a reduced end portion 134a that extends through a bore 135 in the gear shift lever. A removable cross pin 136 prevents retraction of the pivot member from the lever. In the arrangement shown, the pivot member 134 has a knurled head 137 and is surrounded by a coiled spring 138 in compression between the knurled head and the metal body 108. The pressure of the spring 138 presses the metal body towards a washer 140 that lies against the side of the gearshift lever 64.

In the preferred practice of the invention, the housing 76 (Fig. 1) of the master control unit encloses a solid metal block, generally designated by numeral 65 in Figures 10-21, which block corresponds to the dot-dash rectangle 65 in the diagram Figure 22. Preferably the block 65 is a die casting with cavities and passages formed therein for the various components and conduits of the master control unit. The die cast block 65, illustrated by the drawings, is a rectangular body having a top face 141, bottom face 142, left side face 143, right side face 144, front face 145, and back face 146.

Extending inward from the front face 145 of the block 65 are three relatively large horizontal cylindrical cavities forming the previously mentioned master cylinder 42, master cylinder 44, and the accumulator 34. Each of the two master cylinders has a pair of bleeder ports 150 on opposite sides of the range of movement of the piston in the cylinder, the bleeder ports being bores that extend to the top face 141 and are normally closed by a suitable screw 151 provided with a gasket 152. As best shown in Figure 14, the outer end of each of the master cylinders 42 and 44 may be closed by packing assembly of the character heretofore described comprising an inner apertured packing retainer 153, a spacer ring 154, a packing ring 155 of U-shaped cross-sectional configuration, and an outer packing retainer 156. This assembly is held in place by two split retaining rings 157 that seat in suitable inner circumferential grooves in the two cylinders.

The piston rod 49 that is connected to the piston 48 of the master cylinder 42 has a slot 160 (Fig. 15) in its outer end to receive the shank of the manual throttle control member 50 and is pivotally connected thereto by a suitable cross pin 161 (Fig. 10). The lower end of the manual control member 50 is slotted to fulcrum on a second cross pin 162 in a slotted stud 163 that is mounted on the front face 145 of the solid block 65. In like manner, the piston rod 58 that is connected to the piston 57 in the master cylinder 44 has a slot 164 as its outer end to receive the shank of the manual control member 60 and is pivotally connected thereto by a cross pin 165. The lower end of the control member 60 is slotted to fulcrum on a second cross pin 166 carried by a slotted stud 167, the stud being mounted on the forward face 145.

As best shown in Figures 14 and 19, the spring 35 in the accumulator 34 that exerts pressure against the accumulator piston 36, backs against a circular end wall member 168 having a vent aperture 169. The wall member 168 abuts against a suitable split ring 170 that seats in an inner circumferential groove in the wall of the accumulator.

As best shown in Figure 16, the reservoir 33 comprises a relatively large cylindrical cavity extending downward from the top face 141 of the solid block 65 and preferably this cavity is enlarged in the region near its outer end to form an inner circumferential shoulder 174 to serve as a reference mark for the normal or starting liquid level therein. The top of the reservoir 33 may be closed by a suitable friction cover 175.

As shown in Figures 14 and 16, the pump cylinder 30 is a suitably dimensioned bore extending downward from the top surface 141 of the solid block and the plunger 31 that is mounted there may be a relatively long cylindrical member with a reduced end portion 176 to keep the plunger from cutting off flow into and out of the cylinder at the bottom end thereof. The outer end of the plunger 31 extends into a slot 177 (Fig. 11) in the end of the pump handle 32 and is connected to the pump handle by a suitable screw 178. As shown in Figures 10 and 11, the pump handle 32 is connected by a cross pin 179 to a pair of parallel fulcrum links 180, the links in turn being pivotally connected at the lower ends to the solid block 65. As shown in Figure 13, the lower ends of the fulcrum links 180 may extend into a pair of corresponding guide slots 181 in the solid block and may be pivotally mounted on a suitable screw 182 that intersects the two slots.

If desired, the hand pump may be simplified by forming the plunger 31 with a suitable handle for direct operation. For example, Figure 23 shows a pump plunger 31a formed with a suitable handle 183.

The various bores in the solid block 65 that provide the various conduits required in the master control unit are shown in the perspective view Figure 21, and in the sectional views Figures 14–20. Portions of some of the bores are omitted in the perspective view for the sake of clarity.

Conduit A for fluid flow into the pump cylinder 30 on the suction stroke of the plunger 31 and outflow on the power stroke is a bore 190 (Figs. 14 and 16) that extends inward from the back face 146 of the solid block and is closed at its outer end by a suitable plug 191. Conduit B that branches from conduit A to the reservoir 33 is a bore 192 (Figures 14 and 19) that extends inward from the left side face 143 of the solid block, the bore intersecting the bore 190 and being closed at its outer end by a plug 193. Conduit C that branches from conduit A to the accumulator cylinder 34 comprises a series of three bores best shown in Figure 19, namely, a portion of the previously mentioned bore 190, a transverse bore 194 from the left side face 143, and a bore 195 that extends inward from the inner end of the accumulator cylinder. The bore 194 is closed at its outer end by a plug 196. The bore 190 is enlarged and adapted for mounting of the previously mentioned check valve 40 therein and in like manner, the bore 195 is enlarged and adapted for mounting the check valve 41 therein, the check valve 40 preventing reverse flow into the reservoir 33 on the power stroke of the pump and the check valve 41 preventing reverse flow from the accumulator 34 on the suction stroke of the pump. All of the check valves in the master control unit may be of similar construction, each comprising a ball 197, a spring 198 that urges the ball to closed position, and a threaded bushing 199 that seats the end of the spring.

As shown in Figure 14, conduit D for fluid flow from the accumulator 34 to the manifold E may comprise simply a bore 200 slanting upward from the inner end of the accumulator. Manifold E is simply a larger bore 204 that extends inward from the left side face of the solid block and is closed at its outer end by a plug 205. As shown in Figure 18, manifold G is a similar relatively large bore 206 that also extends inward from the left side face 143 and is closed at its outer end by a plug 207. Conduit F that inter-connects the two manifolds E and G is a similar bore 208 that extends downward from the top face 141 of the solid block and is closed at its outer end by a plug 210.

As best shown in Figure 20, conduit H that extends from manifold E to the outer end portion of the master cylinder 42, is formed by two intersecting bores 213 and 214 which are closed at their outer ends by corresponding plugs 215 and 216. Bore 213 extends inward from the front face 145 of the solid block, the bore extending to the manifold E and being enlarged and adapted for mounting of the check valve 43 that prevents reverse flow from the master cylinder 42 to the manifold. The second bore 214 extends downward from the top face 141 of the solid block and not only intersects the bore 213, but also intersects tangentially the master cylinder 42 to form an elliptical port 217 in the side of the master cylinder.

In like manner, conduit I that connects manifold E with the outer end portion of the master cylinder 44 is formed by a similar horizontal bore 218 (shown in dotted lines in Figure 14) and a similar vertical bore 219. The horizontal bore 218 extends inward from the front face 145 of the solid block and is closed at its outer end by a plug 220 (Figure 12), this bore being enlarged and adapted for mounting of the check valve 45 therein (shown in dotted lines in Fig. 14). As shown in Figure 14, the vertical bore 219 extends downward from the top face 41, being closed at its outer end by a plug 221. This bore intersects the master cylinder 44 tangentially to form an elliptical port 222 therein (Figure 14).

As shown in Figure 15, conduit J, for communication between the manifold G and the inner end of the master cylinder 42, comprises a bore 46 at the inner end of the cylinder, and in like manner, conduit K is formed by a similar bore 47 at the inner end of the second master cylinder 44. These two bores are enlarged and adapted for the corresponding check valves 46 and 47.

As shown in Figure 20, conduit L for connecting the inner end of the master cylinder 42 with the external tubing 68 is formed by two intersecting bores 230 and 231. Bore 230 which extends inward from the rear face 146 of the solid block is connected directly to the tubing 68. Bore 231 is closed at its outer end by a suitable plug 232 and intersects the master cylinder 42 tangentially to form an elliptical port 233 therein. In like manner, as shown in full lines in Figure 17 and in dotted lines in Figure 14, conduit N for connecting the inner end of the master cylinder 44 with the external tubing 70 comprises a bore 235 extending inward from the rear face 146 of the block and a vertical bore 236 extending downward from the top face 141. The bore 235 is connected to the external tubing 70 and the bore 236, which is closed at its outer end by a plug 237, intersects the master cylinder 44 tangentially to form an elliptical port 238 therein.

The conduit M for connecting the outer end portion of the master cylinder 42 with the external tubing 69 may be provided by a bore 240 (Figures 17 and 20) extending inwardly from the back face 146 of the solid block to the previously mentioned bore 214. Conduit M includes all of the bore 240 and the lower portion of the bore 214. In like manner, conduit O for connecting the outer end of the master cylinder 44 with the external tubing 71 may be provided by a bore 241 (Figures 17 and 19) extending inward from the back face 146 of the solid block to the lower end of the previously mentioned bore 219. Conduit O includes all of bore 241 and the lower portion of bore 219.

It is apparent from the foregoing description of the solid block 65 that cavities formed in the block provide the pump cylinder 30, the reservoir 33, the accumulator 34, and the two master cylinders 42 and 44; and that the system of bores or passages in the solid block provides the conduits A—O. Thus the solid block 65 provides all of the structure included in the dash-dot rectangle 65 in Figure 22.

My description in specific detail of the presently preferred practice of the invention will suggest to those skilled in the art various changes, substitutions, and other departures from my disclosure that properly lie within the scope and spirit of the appended claims.

I claim:
1. A master unit of a dual hydraulic remote control system for selectively actuating two slave units, said master unit comprising: a rectangular block of solid material approximately square in cross section and half again longer than its width and with its longitudinal axis normally horizontal, three horizontal bores of substantial diameters extending into said body longitudinally about half way the length thereof and from the same end, two of said bores forming master cylinder chambers and the third bore an accumulator cylinder chamber, said master cylinder chambers being on the same level, two vertical bores, one of a substantially larger diameter than the other, extending into said body from the top thereof in the opposite end portion of said body from that occupied by said horizontal bores, the larger of said vertical bores providing an oil reservoir, the smaller of said vertical bores providing a pump chamber; a plunger slidable in said pump chamber; means external of said block for manually actuating said plunger; a piston in said accumulator chamber; spring means in said accumulator chamber for maintaining said accumulator piston under constant yieldable pressure; pistons in said master cylinder chambers; piston rods for actuating said pistons; seal means in the mouths of said master cylinder chambers for slidably receiving said rods; manual means external of said block for reciprocating said rods and said master cylinder pistons; passage means formed by holes bored in said block connecting the lower end of said reservoir with the lower end of said pump chamber and with the inner end of said accumulator chamber; check valve means in said passage means preventing a return flow of oil to said reservoir or from said accumulator chamber; four slave unit actuating passages formed by holes drilled in said block, one of these connecting to each of the opposite ends of the operative portions of said master cylinder chambers; means at the outer ends of said four passages for connecting these to opposite ends respectively of said two slave units; a manifold formed by holes bored in said block and connecting with said opposite ends of the operative portions of said master cylinder chambers and with the inner end of said accumulator chamber; and check valve means in said manifold preventing a return flow into said manifold of oil from opposite ends of the operative portions of said master cylinder chambers.

2. A combination as in claim 1 in which said slave unit actuating passages lie in vertical planes outwardly tangent with said master cylinder chambers and include vertical holes which intersect with said chambers and horizontal holes which connect with lower ends of said vertical holes and terminate at the opposite end of said block from that in which said three horizontal bores are formed.

3. A combination as in claim 1 in which said manifold is formed by two parallel horizontal holes lying in a transverse vertical plane located between said vertical reservoir bore and the inner ends of said longitudinal bores, one of said horizontal manifold holes lying in the same horizontal axial plane with said master cylinder chambers and being connected with the latter chambers by horizontal holes formed in said block from the inner ends of said chambers, said manifold also including a vertical hole formed in said block for connecting said horizontal holes, a hole connecting said manifold with the inner end of said accumulator chamber, and a pair of horizontal holes connecting opposite ends of the other of the aforementioned horizontal manifold holes with corresponding vertical holes of the slave unit actuating passages connecting with the outer ends of the operative portions of said master cylinder chambers; and means for installing said manifold check valve means in said manifold holes directly connecting with the inner ends of the master cylinder chambers, and in the terminal portions of the horizontal holes last mentioned in defining said manifold where these holes connect with the outer vertical holes of said slave unit actuating passages.

References Cited in the file of this patent
UNITED STATES PATENTS

| Number | Name | Date |
|---|---|---|
| 731,241 | Steiner | June 16, 1903 |
| 1,806,136 | Weiss | May 19, 1931 |
| 1,885,580 | Bradbury | Nov. 1, 1932 |
| 2,205,046 | Nardone | June 18, 1940 |
| 2,210,144 | Day | Aug. 6, 1940 |
| 2,292,916 | Wheelon | Aug. 11, 1942 |
| 2,315,270 | Palmer | Mar. 30, 1943 |
| 2,364,864 | Martin | Dec. 12, 1944 |
| 2,395,811 | Griffith | Mar. 5, 1946 |
| 2,406,173 | Stephens | Aug. 20, 1946 |
| 2,499,563 | Bill | Mar. 7, 1950 |
| 2,527,088 | Young | Oct. 24, 1950 |
| 2,644,701 | Flick | July 7, 1953 |
| 2,669,011 | Brumbaugh | Feb. 16, 1954 |